US007262593B2

(12) United States Patent
Knäbel

(10) Patent No.: US 7,262,593 B2
(45) Date of Patent: Aug. 28, 2007

(54) DEVICE FOR MONITORING DIMENSIONAL, SHAPE, AND POSITIONAL TOLERANCES OF A MECHANICAL WORKPIECE

(76) Inventor: Horst Knäbel, Friedenstrasse 10a, D-40677 Meerbusch (DE)

( * ) Notice: Subject to any disclaimer, the term of this patent is extended or adjusted under 35 U.S.C. 154(b) by 7 days.

(21) Appl. No.: 11/349,876

(22) Filed: Feb. 8, 2006

(65) Prior Publication Data

US 2006/0179674 A1 Aug. 17, 2006

(30) Foreign Application Priority Data

Feb. 15, 2005 (DE) .................. 20 2005 002 372 U

(51) Int. Cl.
*G01B 7/02* (2006.01)
*G01D 5/12* (2006.01)
*B23Q 17/20* (2006.01)

(52) U.S. Cl. ........................... 324/207.24; 324/207.15; 33/542; 33/551; 33/833

(58) Field of Classification Search ..................... None
See application file for complete search history.

(56) References Cited

U.S. PATENT DOCUMENTS 3,891,918 A * 6/1975 Ellis ...................... 324/207.24
4,638,670 A * 1/1987 Moser ................... 324/207.24
4,750,272 A * 6/1988 Caddell ........................ 33/833
4,859,942 A * 8/1989 Charton et al. ........ 324/207.16
5,111,139 A * 5/1992 Rose ..................... 324/207.24
6,538,428 B1 * 3/2003 Sohn ..................... 324/207.24
6,882,143 B2 * 4/2005 Clymer et al. ......... 324/207.15

FOREIGN PATENT DOCUMENTS

DE 195 12 836 10/1995

* cited by examiner

*Primary Examiner*—Christopher W. Fulton
(74) *Attorney, Agent, or Firm*—Friedrich Kueffner

(57) ABSTRACT

A device for monitoring the tolerances of a workpiece has a measuring probe with two separate inductive coils arranged in a housing. A non-magnetizable sensing stylus designed to rest on a workpiece surface to be measured is arranged in the coils and has a deflector body that is a sleeve. The stylus and the deflector body are loaded into a measuring position. The housing has two essentially identical housing halves each having a plane surface with which the housing halves are connected to one another. The housing halves each have a recess and one of the inductive coils is inserted into one of the recesses, respectively. The opposed ends of the housing halves are provided with aligned bores that open into the recesses, respectively. The stylus is arranged coaxially in the inductive coils and has opposed stylus ends projecting through the bores outwardly from the two housing halves.

21 Claims, 3 Drawing Sheets

8
7a
5
11
3b
1
6
9
10
4
10
6
5
8
7
4
11
3a 8a
5
12

7
1
3b
7b
9
3a
7c
8a
23
22
15
24
27
14
20
2

7a
7
5
11
12
3b
13
10
7c
16
3b
18
1
9
III
III
3a
13
7b
15
11
20
14
2

18
17
3a
11
11a
10
12
10
16
21
11
20
11a 7
7a
3c
3b
6
9
3a
28
29
2
15
24

9
6
24
3a
2
28
15
30

3a
9
6
29
2
28
15
31

DEVICE FOR MONITORING DIMENSIONAL, SHAPE, AND POSITIONAL TOLERANCES OF A MECHANICAL WORKPIECE

BACKGROUND OF THE INVENTION

1. Field of the Invention

The invention relates to a device for monitoring the dimensional, shape, and positional tolerances of a mechanical workpiece. The device comprises at least one measuring probe each having a housing, attached to a support, with two separate inductive coils and a sensing stylus resting on the surface to be measured of the workpiece and made of a non-magnetizable material. The stylus is embodied as a piston and supports a deflector body that is in the form of a sleeve, wherein the stylus together with the deflector body is movable by a force into its measuring position.

2. Description of the Related Art

Such a measuring probe is disclosed in German published patent application 195 12 836. In a housing of the measuring probe that is covered by a plate serving as a seal and a guide for the sleeve, a measuring inductive coil and a compensating inductive coil with outwardly extending connecting cables are positioned adjacent to one another for forming a so-called half-bridge; they are embedded in two coil supports comprised of magnetizable material. A coil core sleeve acting as a deflector body is arranged on the sensing stylus and projects in its initial position only minimally into the measuring inductive coil. With increasing measuring travel, the immersion depth of the coil core sleeve in the measuring inductive coil increases. Even though the immersion depth of the deflector body correlated with the compensating measuring coil is manually adjustable, it remains unaffected by the measuring travel and thus the stroke of the sensing stylus. A chamber arranged below the plate covering the housing and delimited by the measuring probe and the support can be loaded by a pressure medium that causes the sensing stylus to contact the workpiece. The travel that is performed when doing so corresponds to the measuring travel that can be detected by the resulting resistance change between the inductive coils connected in series.

Since for such a measuring probe only the impedance of the measuring inductive coil changes as a function of the measuring travel, the total resistance changes by the same amount and thus also the current consumption so that the measuring signal does not behave approximately proportional to the measuring travel and the required measuring amplifier is loaded extremely differently. As a result of the currents of different magnitude, the measuring probe is also differently loaded thermally so that with such a measuring probe, even at high electrical expenditure for linearization of the measuring values, no useful measuring results can be obtained.

SUMMARY OF THE INVENTION

It is an object of the present invention to configure a device for monitoring the dimensional, shape, and positional tolerances of a mechanical workpiece in such a way that for a minimal height and a simple configuration a measuring travel as large as possible and a high measuring precision can be obtained.

In accordance with the present invention, this is achieved for a device of the aforementioned kind in that the housing is comprised of two shell-shaped at least mostly identically designed housing halves that can be connected to one another by plane surfaces wherein, starting at the plane surfaces, in each housing half recesses for one of identically sized and aligned inductive coils and for their connecting lines are present and wherein at the outer ends of the two recesses, each receiving one inductive coil, there are opposed bores that are also aligned with one another for guiding the sensing stylus coaxially extending through the two inductive coils and projecting with both stylus ends from the two housing halves to the exterior.

With this configuration, a high measuring precision is provided with a simple configuration of the measuring probe and with a relatively large available measuring travel. A height of the inductive coils is only minimally greater than a measuring travel of the sensing stylus. In addition, the field of application is significantly broadened and the expenditure for assembly, maintenance and service is reduced.

Further features of the device according to the invention are disclosed in the dependent claims.

DESCRIPTION OF THE PREFERRED EMBODIMENTS

Figure 1:
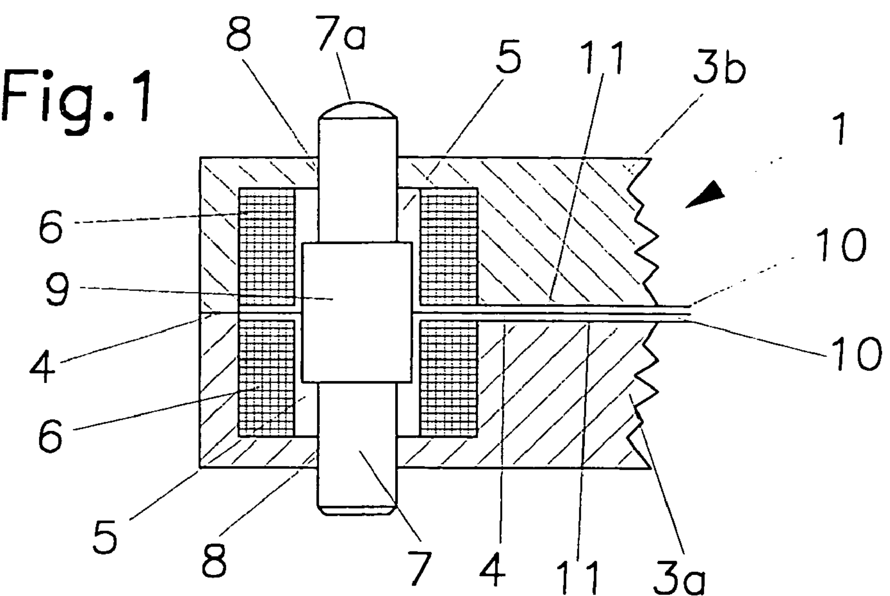
FIG. 1 shows a basic configuration of a measuring probe according to the invention in a section view.

A measuring probe 1 is illustrated in FIGS. 1 to 4 and 5 of the drawing, respectively, and serves for monitoring the dimensions or dimensional deviations of a mechanical workpiece, not illustrated in the drawing. This measuring probe 1 is always comprised of a housing 3 that, according to the invention, is comprised of two shell-shaped housing parts 3*a*, 3*b* (FIG. 1). In this connection, the two housing parts 3*a*, 3*b* are advantageously fixedly connected to one another by gluing in the area of the plane surfaces 4 that are mirror-symmetrical to one another. For functional and manufacture-related reasons, it is expedient that both housing parts 3*a*, 3*b* are identical. Each of the two housing parts 3*a*, 3*b* has a cylindrical recess 5 that, toward the plane surfaces 4, is completely open; each recess receives an inductive coil 6. Both inductive coils 6 are aligned with one another and end advantageously at a minimal spacing relative to the plane surfaces 4.

In the interior of the two inductive coils 6, a sensing stylus 7 is provided that extends coaxially relative to the inductive coils 6; the two stylus ends projects outwardly through bores 8 provided in the housing halves 3*a*, 3*b*. At the stylus end projecting from the housing half 3*b*, the stylus 7 is provided with a sensing surface 7*a*. The stylus 7 is guided exclusively in the bores 8; it is comprised of a non-magnetizable material, for example, ceramic material. These bores 8, as illustrated, for example, in FIG. 4, can also be provided in a bearing bushing 8*a* of a suitable material, for example, bronze, plastic material, or ceramic material. The outer diameter of the sensing stylus 7 in FIG. 1 is significantly smaller than the inner diameter of the inductive coils 6. This makes it possible to arrange on the sensing stylus 7 a deflector body 9 that is comprised of a magnetizable material and is embodied as a sleeve; together with the sensing stylus 7, the deflector body 9 connected thereto is movable within the inductive coils 6 but the deflector body 9 does not take on any guiding function for the sensing stylus 7.

In the illustrated basic position of the sensing stylus 7, the deflector body 9 assumes a central position relative to the two inductive coils 6 and projects symmetrically (with the same body length portion) into the inductive coils 6. This position is the so-called zero sensing position about which the sensing stylus 7 and thus the deflector body 9 are moving. Each inductive coil 6 is provided with two connecting lines 10 that are guided through appropriate cutouts 11 and 11*a* in the plane surfaces 4 of the two housing halves 3*a*, 3*b* to the exterior. Any change of the position of the sensing stylus 7 and thus of the deflector body 9 within the two inductive coils 6 is signaled as a resistance change through the connecting lines 10 to a measuring and evaluating device.

Figure 2:
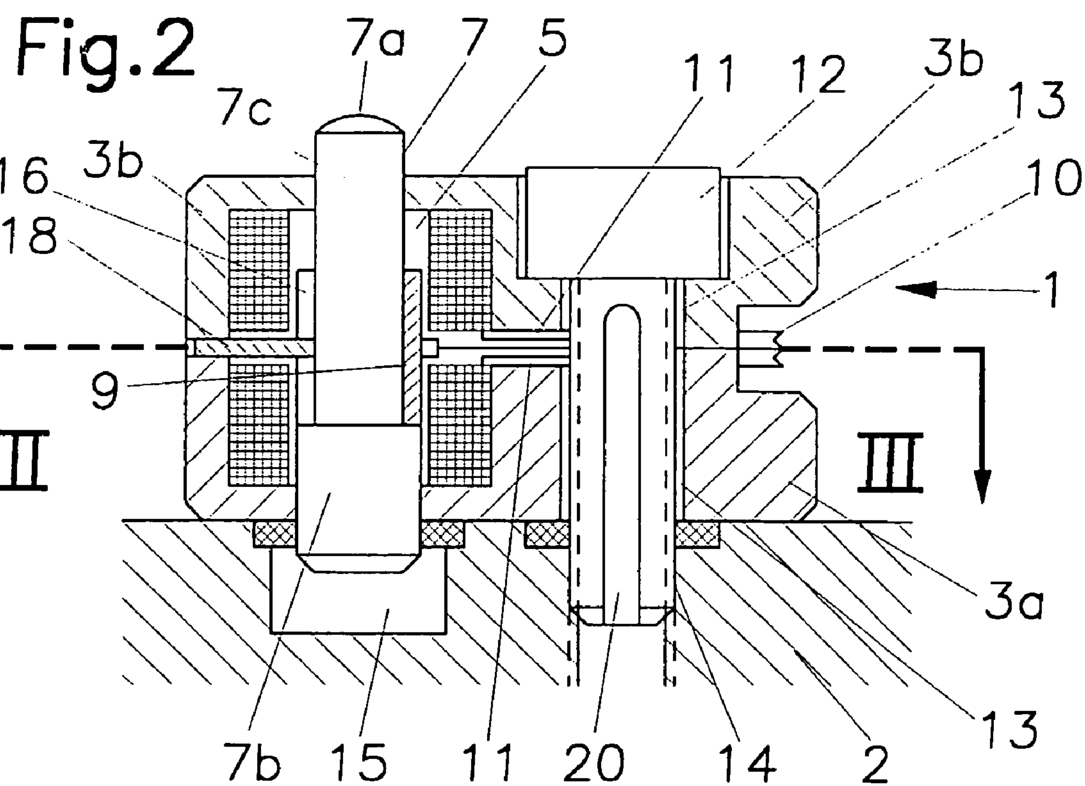
FIG. 2 shows in a sectioned side view a measuring probe for practical use.

One, but usually several, measuring probes 1 of this basic configuration are attached according to FIG. 2 directly to the support 2. The attachment of the measuring probes 1, in a row behind one another or adjacent to one another, on the support 2 is realized by means of a fastening screw 12 that projects through aligned bores 13 provided in both housing halves 3*a*, 3*b* and is screwed into a threaded bore 14 of the support 2. In this connection, the support 2 can have special grooves (not illustrated) that each receive one or several measuring probes 1. By means of the support 2, the measuring probes 1 are moved into the desired measuring position. According to a concrete embodiment, the sensing stylus 7 has two areas 7*b* and 7*c* with different diameters. In this connection, the area 7*c* that is greater and shown as the lower part in FIG. 2 of the sensing stylus 7 is guided in the housing half 3*a* and projects into a chamber 15 of the support 2. The deflector body 9 is arranged in the area 7*b* of the sensing stylus 7 that has the smaller diameter. In this connection, the outer diameter of the deflector body 9 is minimally smaller than the outer diameter of the area 7*c* of the sensing stylus 7. In this configuration, the deflector body 9 in its basic position is arranged centrally relative to the two inductive coils 6.

Figure 3:
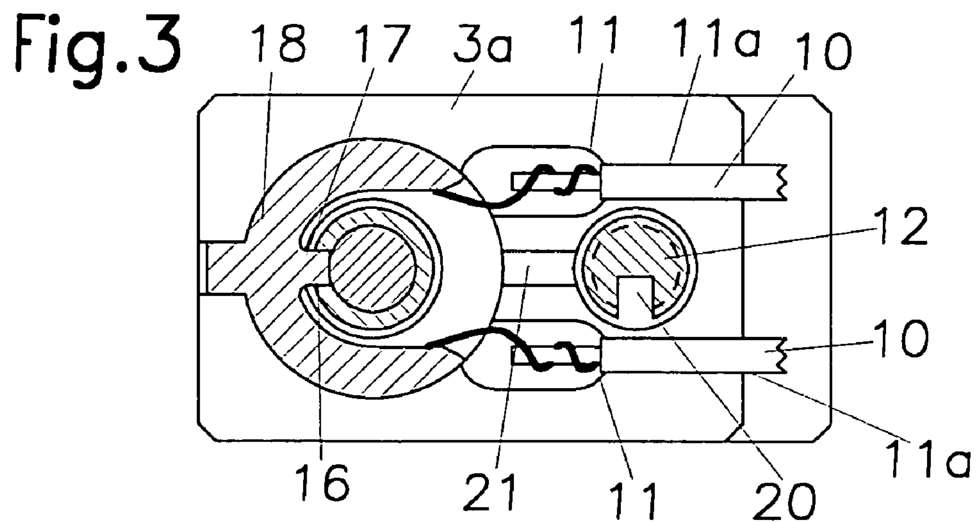
FIG. 3 shows a section of the measuring probe of FIG. 2 according to section line III-III.

As can be seen particularly well in FIG. 3, the coil core sleeve 9 in this embodiment is provided about its circumference with a slot 16 extending in the axial direction; a nose 17 of a disk 18 projects into the slot 16. This disk 18 is received in a matchingly shaped recess 19 that is located, one half each, in the two housing halves 3*a*, 3*b*. The disk 18 with the nose 17 prevents that the sensing stylus 7 can rotate when axially moved. In each of the plane surfaces 4, a cutout 11 and 11*a*, respectively, is provided for receiving one of the connecting lines 10. The larger area of the cutout 11 (FIG. 3) serves for receiving the soldering location where the coil wire is connected to the connecting line 10.

Figure 4:
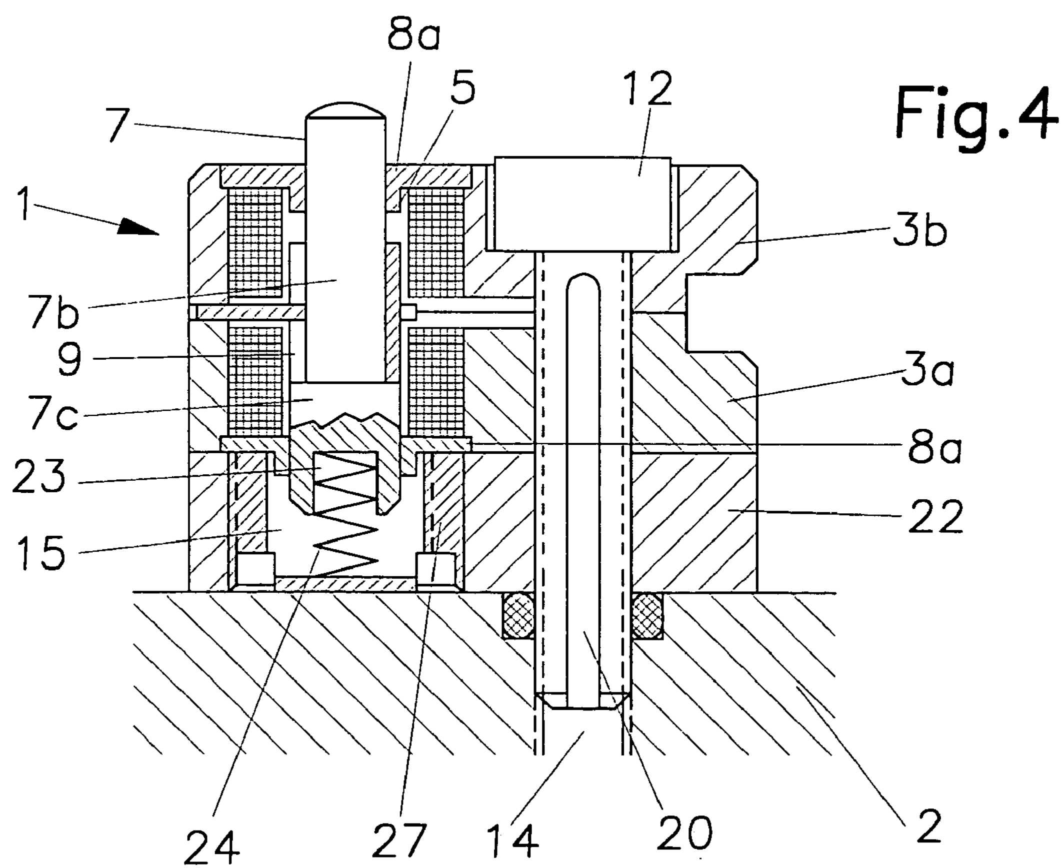
FIG. 4 is a sectioned side view of a further embodiment of a measuring probe according to the invention.

The chamber 15 with its channel 15*a* as well as the threaded bore 14 in the support 2 are connected to lines or conduits (not illustrated) for a gaseous pressure medium and are sealed to the exterior by means of elastic seals between measuring probe 1 and support 2. While the pressure medium in the chamber 15 acts on the enlarged end face of the area 7*c* of the sensing stylus 7, the gaseous pressure medium supplied through the threaded bore 14 reaches the cylindrical recess 5 via groove 20 of the screw 12 and a further groove 21 in the plane surfaces 4 of the two housing halves 3*a*, 3*b*; in the recess 5, the pressure acts on the annular surface of the sensing stylus 7. By appropriately pneumatically loading the recess 5 and the chamber 15, an axial displacement of the sensing stylus 7 in one or the other direction is achieved. As needed, between the bottom of the chamber 15 and the greater end face of the sensing stylus 7 a pretensioned pressure spring 24 can be provided (as shown in FIG. 4). In such a scenario, the supply of the gaseous pressure medium into the chamber 15 is no longer required. By means of the pressure medium guided into the recess 5, the sensing stylus 7 can be displaced against the force of the pretensioned pressure spring only in the direction of the chamber.

The measuring probe 1 of FIG. 4 corresponds in its configuration substantially to the measuring probe 1 of FIGS. 2 and 3. However, the housing 3 is not directly connected to the support 2 but attached sealingly to the support 2 by means of an additional, preferably glued-on, connecting plate or connecting housing 22 by means of screw 12. The thicker area 7*c* of the sensing stylus 7 facing the support 2 is provided at its free end with a blind bore 23 into which a pretensioned pressure spring 24 is inserted. With its other end, the pretensioned pressure spring 24 is supported on the bottom of a closure screw 27 that closes off in the downward direction the chamber 15 already mentioned in connection with FIG. 2. This closure screw 27 enables that the sensing stylus 7 can be exchanged easily and, in particular, in a very short period of time.

As needed, the connecting lines 10 can be connected to a shielded cable in a sleeve (not illustrated) with anti-kink spiral; the shielded cable is connected to the measuring electronics.

Laterally on the housing 3 special grooves (not illustrated) can be formed in which the connecting lines 10 can be positioned so as to be protected. For forming such a protective area, it is also possible that the upper housing half 3*b*, for example, is designed to be wider than the lower housing half 3*a*. In the hollow space provided in this way, the connecting lines of neighboring measuring probes 1 can be guided past the corresponding housing in a protected arrangement. For example, in order to protect the connecting lines 10 also in the area of two spaced apart measuring probes 1, a spacer housing with identical profile can be provided between two measuring probes 1.

In the case of external damage or wear even when utilizing the device properly, it can be necessary to exchange a measuring probe 1 or at least a part thereof. In the case of the measuring probe 1 of FIG. 4, this is not a problem because the chamber 15 of the connecting housing 22 is closed by closure screw 27. When demounting the measuring probe 1 according to FIG. 2, it is however possible that the sensor stylus 7 falls out of the housing. In order to prevent this in general, it is possible according to FIGS. 5 to 7 to close off the measuring probe 1 in the area underneath the sensing stylus 7 by a cap 28 of a soft-magnetic material that is attached by gluing or tacking to the housing part 3*a* or to a part that is fixedly connected to the housing part 3*a*, for example, a bearing bushing 8*a*.

Figure 5:
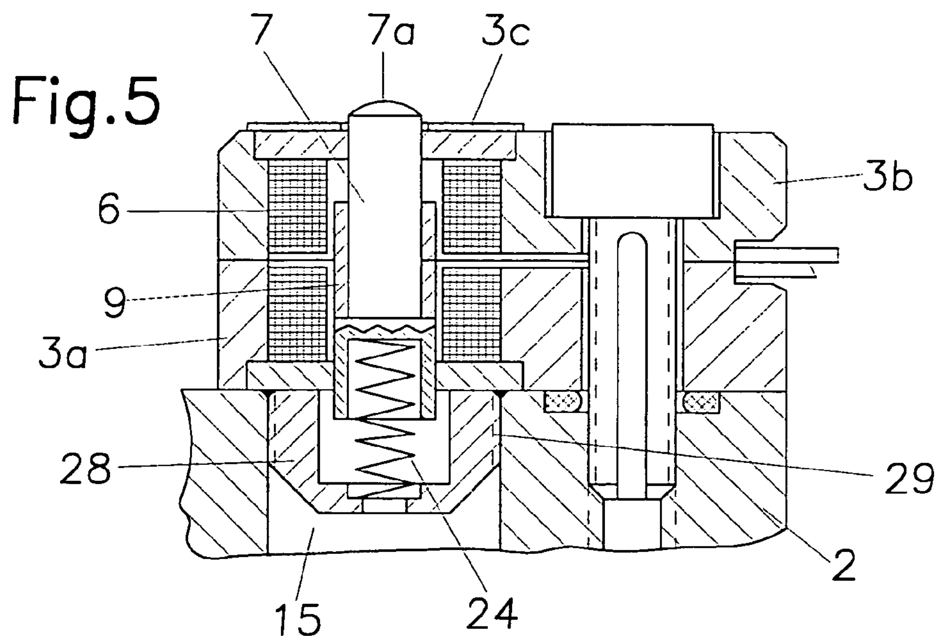
FIG. 5 shows a measuring probe in an illustration substantially identical to FIGS. 2 and 4 showing the housing part facing the support provided with a cap.
Figure 6:
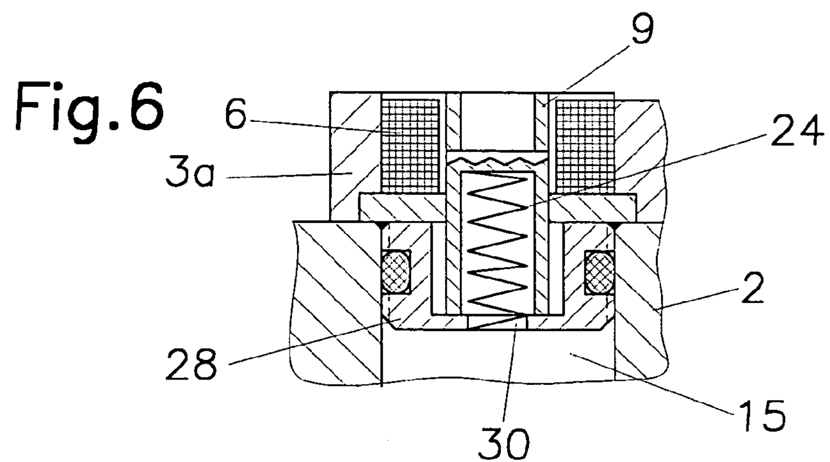
FIG. 6 shows another embodiment of the cap according to FIG. 5.
Figure 7:
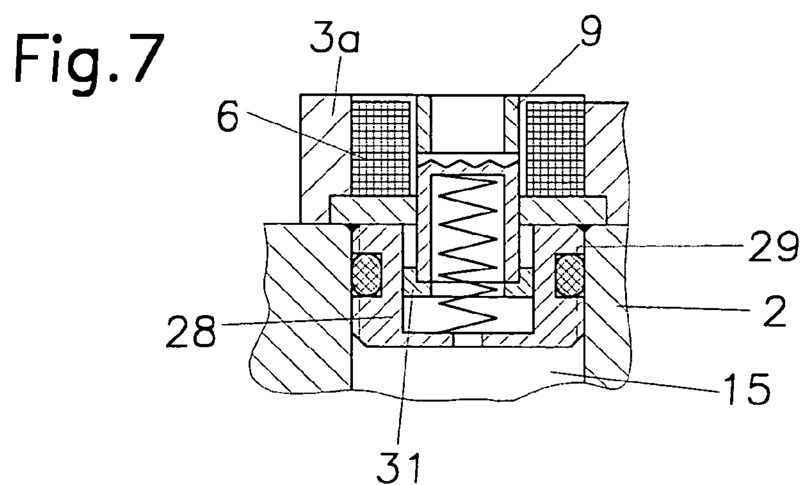
FIG. 7 shows a cap that serves as an anti-rotation device.

By means of this cap 28, the lower area of the coil 6 is magnetically shielded. Each cap 28 of FIGS. 5 to 7 is provided at its outer wall surface with a thread, preferably, with a fine thread 29, which however is not screwed into the chamber 15 but only loosely inserted. This fine thread 29 serves exclusively for removing the cap 28 by means of a threaded sleeve from the housing part 3*a*.

Attachment by gluing or tacking (tack welding) provides a type of rated breaking point. Moreover, in this embodiment a disc 3*c* is attached to the housing part 3*b* or a part that is fixedly connected to the housing part 3*b*, for example, a bearing bushing 8*a*, in the area of the sensing surface 7*a* of the stylus 7; the disc 3*c* is made of a soft-magnetic material and serves for providing magnetic shielding of the inductive coil 6 arranged underneath when the bearing bushing 8*a* positioned in between is comprised of a non-magnetic material. The sensing stylus 7 extends through the disc 3*c*. The attachment of this disc 3*c* can be realized, for example, by soldering or by gluing. The magnetic shielding of the second inductive coil 6 facing the support 2 is realized preferably by the cap 28, the support, or the connecting housing 22 with the closure screw 27. At the bottom of the cap 28 of FIG. 5 a pressure spring 24 is supported in a way similar to the arrangement of FIG. 4. In this configuration, as in the case of the measuring probe of FIG. 4, the sensing stylus 7 is returned by compressed air that can be supplied through the groove 20 in the fastening screw 12 against the force of the spring 24. The thus created inner pressure in the housing 3*a*, 3*b* ensures moreover that no contaminants, for example, liquid, can penetrate into the recess 5 of the measuring probe 1; the gaseous medium can be used for flushing and cleaning the interior of the measuring probe 1.

In the embodiment of FIG. 6 the spring 24 is however configured as a tension spring and its lower end facing away from the sensing stylus 7 is secured in opening 30 of the cap 28. In this connection, the sensing stylus 7 can be loaded through chamber 15 and the opening 30 with compressed air and can be pneumatically advanced against the force of the spring 24. Should an inner pressure in the recess 5 be desirable in this configuration, it is also possible to supply compressed air via the groove 20 into the fastening screw 12 at the same time. This inner pressure must however be adjusted such that it does not prevent during pneumatic control from the exterior the sensing stylus 7 retained by the spring 24 from properly functionally contacting with its sensing surface 7*a* the workpiece to be probed.

In the embodiment illustrated in FIG. 7, the cap 28 has in its interior a profiled cross-section, for example, a square cross-section. On the lower area 7*c* of the sensing stylus 7, a profiled disc 31 is arranged that is fixedly connected to the stylus 7. The outer contour of the disc 31 matches approximately the inner cross-section of the cap 28. With such a configuration, the sensing stylus 7 is secured against rotation as in the embodiment of FIGS. 2 and 3. Such a disc 31 can also be used in the embodiments of FIGS. 5 and 6. However, this requires a corresponding inner profiling of the cap 28.

While specific embodiments of the invention have been shown and described in detail to illustrate the inventive principles, it will be understood that the invention may be embodied otherwise without departing from such principles.

What is claimed is:

1. A device for monitoring the dimensional, shape, and positional tolerances of a mechanical workpiece, the device comprising:

at least one measuring probe comprising a housing attachable to a support; first and second separate inductive coils arranged in the housing and having identical size; a sensing stylus adapted to rest on a surface to be measured of a workpiece; and a deflector body arranged on the sensing stylus;

wherein the sensing stylus is a piston comprised of a non-magnetizable material;

wherein the deflector body is a sleeve;

wherein the sensing stylus and the deflector body are movable by a force into a measuring position;

wherein the housing is comprised of a first shell-shaped housing half and a second shell-shaped housing half, wherein the first and second housing halves are at least mostly identically designed and each have a plane surface, wherein the first and second housing halves are connected to one another at the plane surfaces;

wherein the first and second housing halves each have a recess beginning at the plane surface, respectively;

wherein the first inductive coil has first connecting lines and is inserted together with the first connecting lines into the recess of the first housing half;

wherein the second inductive coil has second connecting lines and is inserted with the second connecting lines into the recess of the second housing half so as to be aligned with one another;

wherein the first and second housing halves have opposed ends, wherein the opposed ends have a bore opening into the recess, respectively, and the bores are aligned with one another;

wherein the sensing stylus is arranged coaxially in the first and second inductive coils and has opposed stylus ends projecting through the bores outwardly from the two housing halves.

2. The device according to claim 1, wherein the deflector body in a central position of the sensing stylus projects symmetrically into the first and second inductive coils.

3. The device according to claim 1, wherein a height of the first and second inductive coils is only minimally greater than a measuring travel of the sensing stylus.

4. The device according to claim 1, wherein the sensing stylus is comprised of ceramic material.

5. The device according to claim 1, wherein the bores each are provided with a bearing bushing for guiding the sensing stylus.

6. The device according to claim 1, wherein the stylus ends projecting from the first and second housing halves each have a different diameter but are exactly coaxial to one another.

7. The device according to claim 6, wherein a first one of the stylus ends projecting from the first housing half has a sensing surface, wherein the diameter of a second one of the stylus ends remote from the sensing surface and projecting from the second housing half is greater than the diameter of the first stylus end, wherein the second stylus end is enclosed by cap connected to the second housing half.

8. The device according to claim 7, wherein a pressure spring is arranged between the second stylus end and the cap.

9. The device according to claim 8, wherein the cap is attached to the second housing half by gluing or tacking.

10. The device according to claim 7, wherein the cap has an inner profiled wall and the second stylus end has a profiled disc as an anti-rotation device that is received in the cap.

11. The device according to claim 1, comprising an anti-rotation device preventing a rotation of the sensing stylus within the housing, wherein the sleeve has an axially extending slot for receiving a nose of the anti-rotation device.

12. The device according to claim 1, wherein the housing is connected by a fastening screw to a supply of a gaseous medium for flushing and cleaning an interior of the housing and for returning the sensing stylus.

13. The device according to claim 12, wherein the gaseous medium is supplied through a support to which the at least one measuring probe is attached.

14. The device according to claim 12, wherein the gaseous medium is supplied to the interior of the housing through a connecting plate arranged between the housing and a support to which the housing is attached.

15. The device according to claim 1, wherein the at least one measuring probe comprises a connecting plate having an opening aligned with the sensing stylus, wherein the opening is closed by a closure screw and has a cross-section that is greater than a cross-section of the sensing stylus.

16. The device according to claim 15, wherein between the closure screw and the sensing stylus a pretensioned pressure spring or a pretensioned tension spring is arranged.

17. The device according to claim 1, wherein the housing has an exit area where the connecting lines exit from the housing, wherein the exit area has recesses for positioning and deflecting the connecting lines as needed.

18. The device according to claim 1, wherein the second housing half adapted to be connected to a support has at least one side that is narrower than a corresponding side of the first housing part.

19. The device according to claim 1, further comprising a spacer housing positioned in an intermediate space between two of said at least one measuring probe attached to a support and closing the intermediate space.

20. The device according to claim 1, wherein the at least one measuring probe is arranged in a groove of a support to which the at least one measuring probe is attached.

21. The device according to claim 1, further comprising a measuring electronics that eliminates non-linearity and is connected to at least one of the at least one measuring probe.

* * * * *